United States Patent [19]
Farley

[11] Patent Number: 4,879,776
[45] Date of Patent: Nov. 14, 1989

[54] ANATOMICALLY CONFORMABLE FOAM SUPPORT PAD

[76] Inventor: David L. Farley, 18672 Evergreen Ave., Yorba Linda, Calif. 92686

[21] Appl. No.: 176,925

[22] Filed: Apr. 4, 1988

[51] Int. Cl.⁴ ............................................. A47C 27/14
[52] U.S. Cl. ......................................... 5/436; 5/464; 5/481
[58] Field of Search ................... 5/434, 436, 464, 481, 5/468; 297/DIG. 1

[56] References Cited

U.S. PATENT DOCUMENTS

| | | |
|---|---|---|
| 2,902,091 | 9/1959 | Dahle . |
| 3,197,357 | 7/1965 | Schulpen . |
| 3,311,007 | 3/1967 | McGee . |
| 3,431,802 | 3/1969 | Schulpen . |
| 3,690,203 | 9/1972 | Huttemann . |
| 3,695,128 | 10/1972 | Gentile . |
| 3,730,031 | 5/1973 | Huttemann . |
| 3,828,378 | 8/1974 | Flam ..................................... 5/464 |
| 4,335,476 | 6/1982 | Watkin .............................. 5/481 X |
| 4,351,211 | 9/1982 | Azzolini . |
| 4,392,489 | 7/1983 | Wagner, Sr. . |
| 4,522,447 | 6/1985 | Snyder et al. ...................... 5/464 X |
| 4,550,547 | 11/1985 | Wagner, Sr. . |
| 4,603,445 | 9/1986 | Spann ..................................... 5/481 |
| 4,620,337 | 11/1986 | Williams et al. . |
| 4,672,700 | 6/1987 | Poncy . |
| 4,673,452 | 6/1987 | Awdhan ............................. 5/481 X |
| 4,679,266 | 7/1987 | Kraft . |
| 4,686,724 | 8/1987 | Bedford .............................. 5/481 X |

FOREIGN PATENT DOCUMENTS 1015240 11/1981 Fed. Rep. of Germany .......... 5/434

OTHER PUBLICATIONS

SpanAmericia Medical Systems Geo-Matt Brochure, pp. 1-4, 1986.
Biogart Critical Care Floatation Unit Flier, pp. 1-2, Feb. 1985.
Med Foam Flier, p. 1, date unknown.
Two Official Gazette entries, Sep. 6, 1988.

Primary Examiner—Michael F. Trettel
Attorney, Agent, or Firm—Knobbe, Martens, Olson & Bear

[57] ABSTRACT

A convoluted foam pad for supporting a reclining human body on a bed including an area for supporting the shoulders of a body, an area for supporting the tail portion of a body and a general support area surrounding the shoulder and tail support areas for supporting the remainder of the body. Each support area is formed by peaks arranged in rows, wherein each peak has a flat top and is spaced from any adjacent peak in the same row by a valley. The average valley thickness of the valleys in both the shoulder support area and the tail support area are less than the average valley thickness of the valleys in the general support area. Another aspect of the invention is a method of manufacturing convoluted foam pads including compressing a foam block between two rollers having radially extended fingers of varying effective heights, cutting the compressed block into halves having varying peak heights and valleys having varying valley floor heights, and cutting the tops of the peaks off the create areas having lower volumes of foam than other areas.

20 Claims, 6 Drawing Sheets

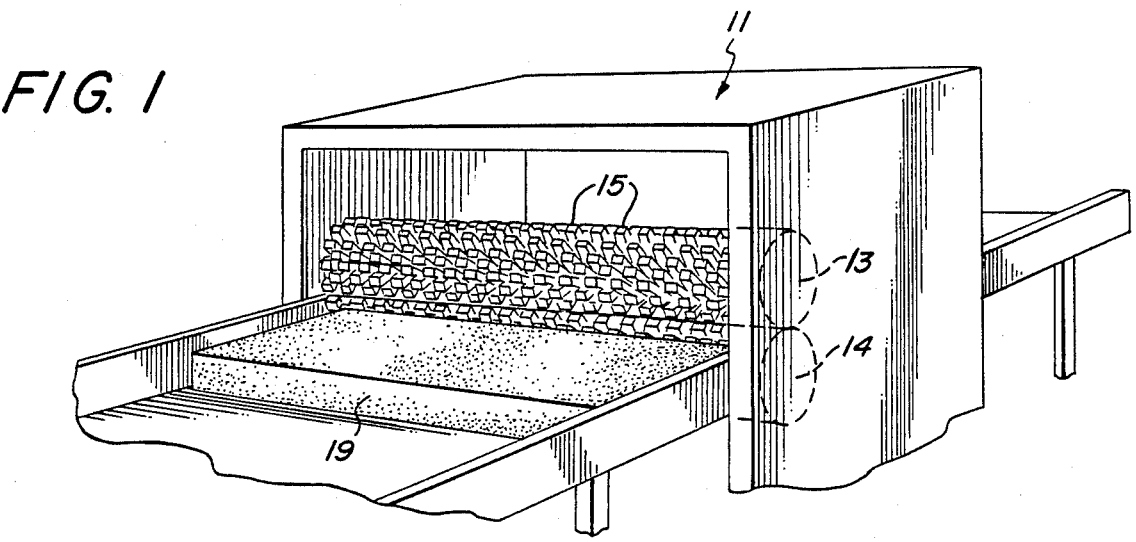
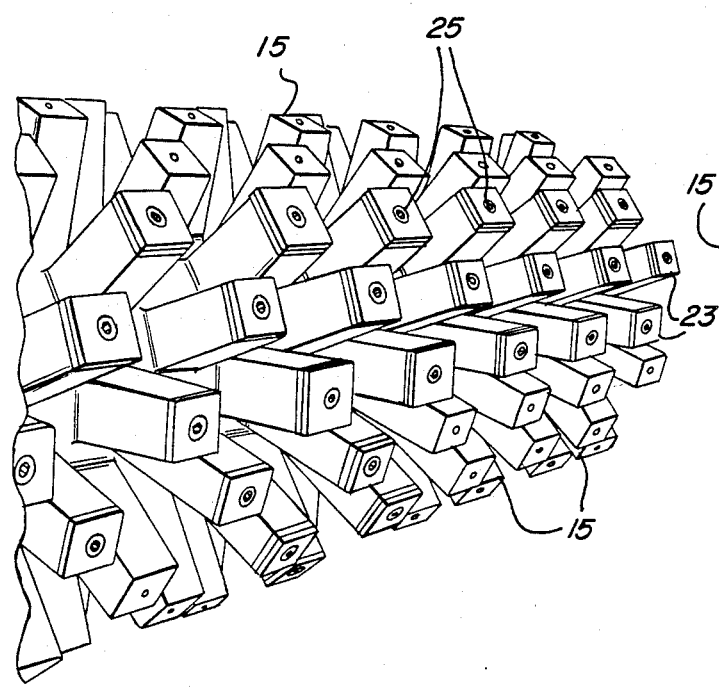
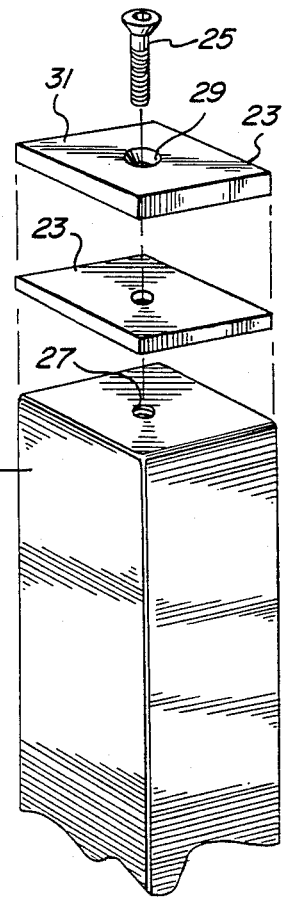

ANATOMICALLY CONFORMABLE FOAM SUPPORT PAD

BACKGROUND OF THE INVENTION

This invention relates to pads for supporting the seated and recumbent human body which redistribute body weight away from bony prominent areas, which areas are the most susceptible to the formation of pressure ulcers and, in particular, to convoluted foam pads used for this purpose.

Two of the primary causes of pressure ulcers are pressure and moisture. The pressure results from the supporting surface resisting the force of gravity on the body. For mattresses, this pressure is typically the highest beneath the shoulder (the scapulae) and tail (the sacrum and trochanter), generally the areas of greatest mass and projection. In these high pressure areas, the pressure against the body can be sufficient to occlude the capillaries and lymph vessels, thereby preventing the circulation of oxygen and nutrients to the skin. In addition, because airflow over these skin areas is typically prevented due to the surface of the mattress, greater amounts of moisture are excreted for the dissipation of heat and waste. Over a sufficient period of time, the combination of high pressure and moisture will lead to the formation of pressure ulcers.

In an effort to combat the formation of pressure ulcers among patients, hospitals utilize a number of types of bed pads for their patients who fall into high risk categories. These products include static air, water and foam support pads. Although these pads cannot reduce the overall resistance of the mattress to the weight of the body, they can reduce the level of pressure on the areas of highest pressure by redistributing the load and allowing a greater portion of the pad to support the body. Each of these types of pads has different advantages and disadvantages.

Generally, static air and water support pads provide superior high pressure reduction capabilities at the bony prominences, but permit only limited air flow and heat dissipation. In addition, both static air and water support pads require filling, are susceptible to leaks and tend to "bottom out" (i.e., permit the weight of the user to displace the air or water in the pad to the extent that the user is supported by the mattress, rather than by the air or water cushion). Static water support pads also are undesirable in that they are heavy and unwieldy to transport. While pumps and valves can be used to vary the pressure resistance of the static air and water pads over time, these features render the pad both expensive and difficult to install and transport.

Convoluted foam pads, on the other hand, are generally relatively inexpensive and easily transported, while providing superior air flow potential and moisture reduction capabilities. Unfortunately, despite considerable study and effort, it has proved exceedingly difficult to develop an easily manufactured convoluted foam pad which is capable of providing pressure reduction characteristics comparable to static air and water support pads.

The manufacture of convoluted foam pads continues to largely follow the methods taught by U.S. Pat. No. 3,431,802, which patent is hereby incorporated by reference. The pads are typically formed by feeding a foam block between two cooperating parallel cylinders, each of which has a undulated surface. The cylinders rotate towards one another and are spaced so that the block inserted between them is compressed between the cylinders and is driven against a cutting edge which slices the block in half. Each half generally comprises alternating rows of peaks and valleys, in checkerboard fashion. The resulting halves are perfectly matched so that when one half is laid upon the other, the tops of the peaks of one half rest against the floor of the valleys of the other half forming a solid block. In addition, although it is possible to manufacture pads which are not the mirror image or reflection of one another, this is rarely done, as it would typically result in only one usable half, thereby significantly increasing material costs.

One convoluted foam pad currently in use is disclosed in U.S. Pat. No. 4,686,724. The pad is comprises alternating columns of peaks and valleys in checkerboard fashion. Air channels are stamped, press cut or laser cut through the floor of the valleys to the bottom face of the pad, leaving removable plugs used to selectively control the amount of aeration and dissipation of body heat permitted by the pad.

In one embodiment, the peaks of the pad are "topped off" to create a broken flat surface, interposed with valleys, with the distance between the floor of each valley and the bottom surface of the pad being constant. Within each valley is a channel extending from the valley floor to the flat bottom face of the pad. The patent teaches that a skin area of 1.25 inches in diameter or less, even though denied air circulation, can sustain itself from air circulating in an adjacent area. Therefore, by limiting each peak top to a diameter of 1.25 inches or less, the occurrence of decubitus ulcers can, according to the patent, be virtually eliminated. Unfortunately, the use of this uniform pad with its removable plugs has found little acceptance in practice, perhaps because the removal and replacement of the individual plugs is relatively difficult and time consuming.

A second convoluted foam pad is disclosed in U.S. Pat. No. 4,620,337. The pad is designed to prevent the formation of decubitus ulcers by minimizing the amount of pressure exerted on the body. The pad has three distinct sections: a convoluted head supporting section; a ribbed torso supporting section; and a convoluted foot and leg supporting section. As with most foam pads which are manufactured from a block of uniform thickness, the sum of the distance from the bottom face of the pad to the top of any peak (the "peak height") and the distance from the bottom face of the pad to the floor of any valley (the "base height" or "valley floor height") remains constant. This arises from the fact that although the height of the undulating surface of the paired cylinders varies along their length, the opposing undulating surfaces are of an equal height.

The pad is designed on the premise that heavier portions of the body are less likely to develop pressure ulcers when they are supported by a portion of the pad with a lower peak to base ratio, and that lighter portions of the body are less likely to develop pressure ulcers when they are supported by a portion of the pad with a higher peak to base ratio. Accordingly, the ribs of the torso supporting section are shorter than the average height of the peaks of the head or leg supporting sections, and the floors of the valleys of the torso supporting section are higher than the average height of the floors of the valleys of the head or leg supporting sections. Unfortunately, however, the pressure reduction capabilities of this pad are significantly lower than the pressure reduction capabilities of static air or water support pads.

What is needed, therefore, is a convoluted foam pad which is easy to manufacture and provides high pressure area reduction capabilities comparable to the static air and water support pads.

SUMMARY OF THE INVENTION

The present invention solves these problems by providing an easily manufactured convoluted foam pad having pressure redistribution capabilities comparable to the static air and water support pads and a method of manufacturing the same.

One embodiment of the invention is a convoluted foam pad for supporting at least part of a human body having a solid flat lower face and a flat upper surface wherein at least one area of the pad provides less resistance to the weight of the body than other areas of the pad. Desirably, the area providing this decreased resistance corresponds to a protruding portion of the body, thereby allowing the body to sink farther into the pad.

Another embodiment of the invention is an elongate convoluted foam pad for supporting a reclining human body on a bed. The pad includes an area for supporting the shoulders of a body, an area for supporting the tail portion of the body and a general support area surrounding the shoulder and tail support areas for supporting the remainder of the body. Each support area is formed by flat-topped peaks arranged in rows, wherein each peak in the same row is spaced from any adjacent peak by a valley.

To decrease the average pressure levels on the shoulder and tail portions of the body, the average valley thickness (i.e., the average vertical distance between the valley floors and the bottom of the portion of the pad directly beneath the respective valley floors) of the valleys in both the shoulder support area and the tail support area are less than the average valley thickness of the valleys in the general support area. This diminished valley thickness has the dual effect of reducing the resistance of the pad to the weight of the tail and shoulder portions of the body and permitting the tail and shoulder areas of the body to sink farther into the pad. The increased deformation of the pad is significant in that, as the tail and shoulders of the body sink further into the pad, the middle back and extremities exert greater pressure against the general support area of the pad. In addition, the farther the tail and shoulder portions of the body sink into the pad, the greater the amount of total surface area of the pad in contact with the tail and shoulders portions of the body, resulting in a decrease in the average amount of resistance pressure exerted by the pad per square inch in these critical areas.

Desirably, the pad has a flat upper face formed by the flat tops of the peaks of the pad which all lie substantially in a single plane and a solid flat lower face, without holes or cavities. The pad is desirably made from an open cell expanded plastic polyurethane foam with a density of between one and three pounds per cubic foot, and has a peak thickness of between one and five inches.

Another aspect of the invention is a method of manufacturing convoluted foam pads. The method includes compressing a foam block between two rollers having radially extended fingers of varying effective heights. The compressed block is then cut into two halves to form peaks and valleys. As a result of the varying effective heights of the fingers of the rollers, the peaks will have varying peak heights and the valleys will have varying valley floor heights. The tops of the peaks are then cut off to create areas having lower volumes of foam than other areas. These low foam volume areas will tend to provide less resistance to pressure than the areas of the pad having a higher volume of foam.

Desirably, the tops of the peaks are cut so the top of each peak will be in substantially the same plane. Where some of the corners of the peaks are connected by webbing, the method may also include the separating some of the peaks connected by webbing to decrease the resistance of the locale including the separated peaks to pressure.

BRIEF DESCRIPTION OF THE DRAWINGS

These and other features of the invention will now be described with reference to drawings for preferred embodiment is intended to illustrate, and not to limit, the invention, and in which:

FIG. 1 view is a perspective view illustrating a foam block being inserted between a pair of cylindrical rollers;

FIG. 2 is an enlarged partial perspective view illustrating the fingers of the rollers of FIG. 1;

FIG. 3 is an enlarged exploded perspective view of one of the fingers of FIG. 2;

DETAILED DESCRIPTION OF THE PREFERRED EMBODIMENT

FIG. 1 shows an apparatus 11 for manufacturing convoluted foam pads. The apparatus 11 includes a pair of cooperating parallel rollers, 13 and 14, each of which has a cylindrical body and an undulated surface. As more clearly shown in FIG. 2, the undulated surface of each roller is formed by a plurality of fingers 15 of generally rectangular cross section extending radially from its cylindrical body. Naturally, if desired, another shape of finger could be utilized. The fingers 15 are arranged in vertical and horizontal rows. Fingers in vertically adjacent rows are staggered vertically a circumferential distance approximately equal to the vertical width of the fingers. Fingers in horizontally adjacent rows are staggered horizontally a circumferential distance approximately equal to the horizontal width of the fingers.

Figure 4:
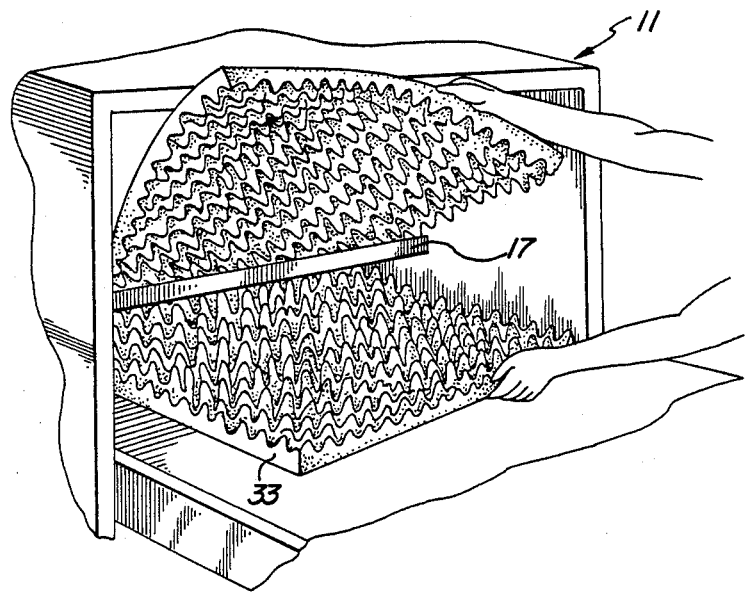
FIG. 4 is an illustration of two convoluted halves of a block after insertion into the apparatus of FIG. 1.

The rotating rollers, 13 and 14, compress and drive the foam block 19 against a cutter (a guard 17 for which is shown in FIG. 4). As shown in FIG. 1, the upper roller rotates counterclockwise and the lower rotates clockwise. This rotation is synchronized so the fingers 15 of the respective rollers are opposed by the spaces 21 between the fingers of the opposite roller, rather than directly by its fingers 15. In addition, to obtain pads which are virtually a mirror image of one another, all fingers 15 on a given side of, and vertically adjacent to, the spaces of one roller have an effective height equal to the effective height of the finger of the opposing roller which opposes the space.

As best seen in FIGS. 2 and 3, the radial height of each of the fingers 15 is equal. Selected fingers, however, have a greater effective radial height as a result of one or more flat rectangular caps 23 or plates being secured to the radial outer end of the finger by a bolt 25 threadably secured within a tapped bore 27 extending radially through the center of the finger. Naturally, the thickness of the caps 23 can be varied depending upon the given application. A countersink 29 may be provided around the bore 27 of the outer cap, so that the head of the bolt 25 is flush with the outer face 31 of the cap.

Figure 5:
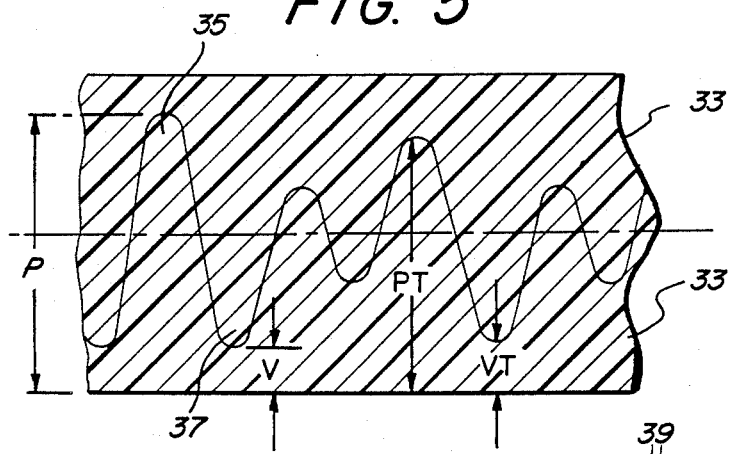
FIG. 5 illustrates the fit between the halves of the block of FIG. 4.

Referring to FIG. 4, after the foam block 19 is compressed between the rollers, it is driven against the cutter (not shown) which slices the block 19 into halves 33. As shown in FIG. 5, the resulting halves 33 are virtually a perfect mirror image of one another, with each peak 35 of one half corresponding to an adjacent peak 37 of equal size on the other half. On the other hand, the variance in the effective height of the fingers 15 results both in peaks with varying peak heights P, and valleys with varying valley floor heights V. Because the pad is cut from a single block 19, however, the sum of the valley floor height and the corresponding peak height will equal a constant, so long as the block being cut is of uniform thickness.

By varying the effective height of the fingers less than one quarter of an inch, the heights of the peaks 42 of the resulting foam halves 33 can be varied 3–4 inches. Naturally, since the block halves 33 are a mirror image of one another, the base height of the corresponding valleys 44 will vary an equal amount. Thus, although the peak to base ratio of the pad can be made to vary widely, essentially the same volume of foam is present to resist the weight of a given area of the body supported by the pad.

Figure 6:
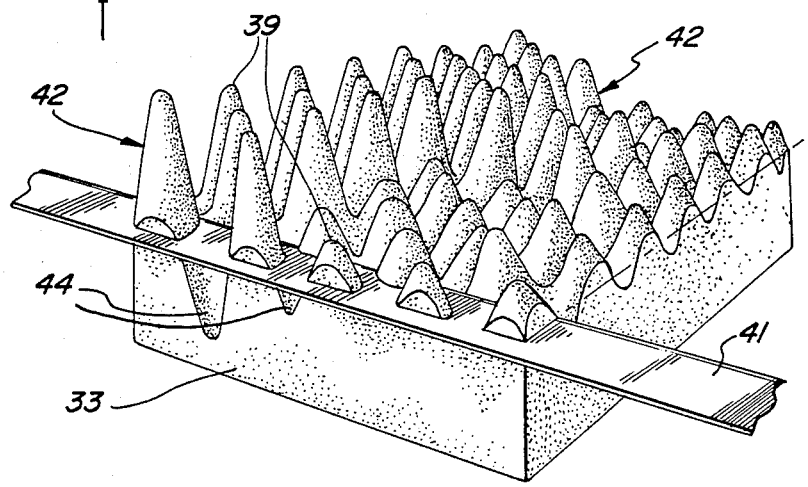
FIG. 6 illustrates the topping-off of the peaks of one of the halves of FIG. 4.
Figure 7:
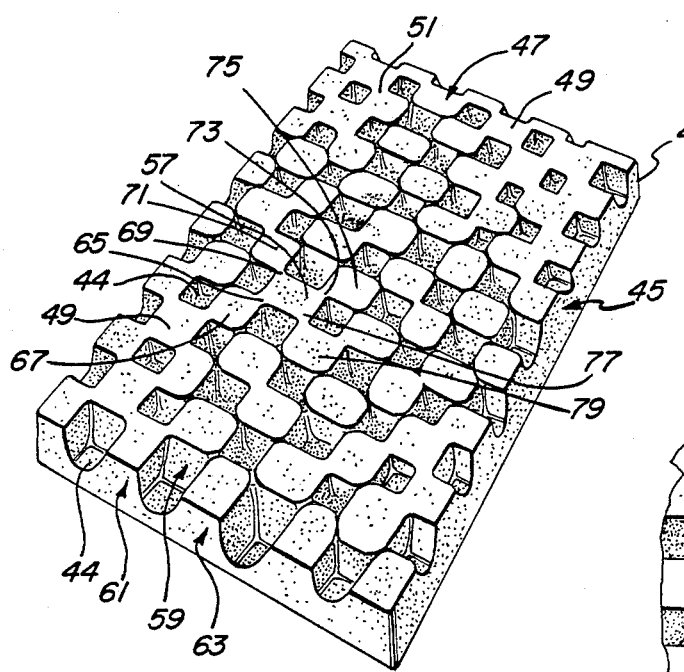
FIG. 7 illustrates the half of FIG. 6 after being saw cut.

As shown in FIG. 6, the tops 39 of the peaks 42 are then removed with a band saw 41 or other suitable cutting device, thereby leaving a rectangular pad 43 with a flat solid lower face 45 and a substantially flat upper face 47 comprised of the flat tops 49 of the peaks 42. As shown in FIG. 7, the pad 43 comprises adjacent rows of peaks 42 of generally rectangular cross section, each of which are separated by valleys 44, also of generally rectangular cross section. Since the peaks 42 in adjacent rows are staggered, the overall effect is a checkerboard pattern, with the corners of the peaks 42 in adjacent rows connected by webbing 51 extending between the peaks 42 to the floor of the valleys 44. The webbing 51 between some peaks 42 will extend from the top of the peak downward to the floor of the valley between them. Between other peaks 42, especially those with lower valley heights, the webbing 51 will be spaced below the tops of the peaks 42 and extend downward to the floor of the valley between them. For example, referring to FIG. 7, a peak 57, in a row of peaks 59 between a second and third row of peaks, 61 and 63, respectively, has a first corner 65 connected by webbing 51 to a corner of a first peak 67 in the second row 61 and a second corner 69 which is connected by webbing 51 to a corner of a second peak 71 in the second row 61. Likewise, the peak 57 has a third corner 73 which is connected by webbing 51 to a corner of a first peak 75 in the third row 63 and a fourth corner 77 which is connected by webbing 51 to a second peak 79 in the third row 63.

To obtain two generally uniform pads from a single block 19 it is desirable that the tops of the peaks 42 are cut off at a point midway between the tops of the peaks 42 and the floor of the valleys 44. Although each of the remaining flat-topped peaks 42 will have a uniform peak height, the base height of the valley floors varies in proportion to the effective height of the finger which created it. Since the pad 43 has a flat lower face 45, the peak height of each peak is equal to its peak thickness (i.e., the vertical distance between the top of the peak and the bottom of the portion of the pad 43 directly beneath the peak). Naturally, if the lower face of the pad 43 included an opening beneath the peak, this would not be the case. Likewise, the valley floor height of each valley of the illustrated pad 43 is equal to its valley thickness (i.e., the vertical distance between the valley floor and the bottom of the portion of the pad 43 directly beneath the valley floor). If the lower face 45 of the pad 43 included an opening beneath the valley floor, however, this would not be the case.

By increasing the effective height of the fingers 15 which correspond to the areas of the pad 43 supporting the shoulder and tail portions of the body, taller peaks 42 and lower valleys 44 are formed in those areas of the pad 43. By evening out the heights of the peaks 42 by topping them off at a certain height, one is left with a smaller volume of foam to resist the weight of the that portion of the body. It has been found that the smaller the volume of foam in a given area, the smaller the level of resistance of the foam to the weight of the body will be. By decreasing the volume of foam beneath these heavier portions of the body, the more the weight of the body portions to overcome the resistance of the pad and sink into the foam. This, in turn, increases the surface area of the pad in contact with the body portion, thereby further diminishing the level of pressure exerted on the skin of the body per unit area. In addition, since both the shoulder and tail portion of the body protrude farther than the lighter portions, as the shoulder and tail portions sink into the pad, the pressure of the pad on the less protruding portions (e.g., the middle of the back) will increase, thereby relieving pressure from the tail and shoulder portions of the body.

The pad of the present invention can be made from a wide variety of types of foam of varying density and thickness. It has been found, however, that the desired combination of cushioning and support is obtained from an open cell expanded plastic polyurethane foam with a density of between one and three pounds per cubic foot, preferably 1.5 pounds. The peak and valley thickness of the pad 43 is desirably sufficient to ensure that the body supported by the pad does not bottom out. For a bed pad 43 having a density of between 1-3 pounds, a peak thickness of between 3-5 inches, and a valley thickness of approximately one half of an inch has been found to be sufficient to prevent bottoming out in most instances. In home health care applications, however, significant benefits can be realized from a pad with a peak thickness as low as one inch and a valley thickness as low as one-eighth of an inch, which imposes a concavity to the bed surface for comfort, as opposed to therapeutic purposes.

Figure 8:
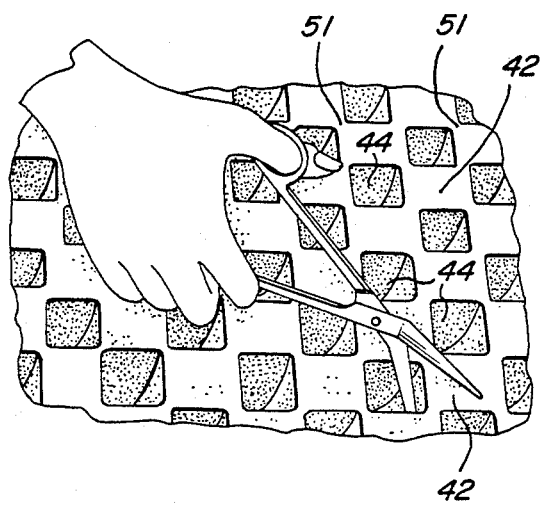
FIG. 8 illustrates the clip cutting of the half of FIG. 7.

At times, in addition to the standardized pressure reduction capabilities of the pad 43, it is desirable in the case of burns or other localized injury to decrease the level of pressure resistance in a given area of the pad. As illustrated in FIG. 8 this may be accomplished by cutting the webbing 51 connecting the corners of the peaks 42 in adjacent rows to separate the peaks 42. This has the effect of decreasing the "hammock effect" between the separated peaks. The hammock effect results from neighboring peaks resisting the tendency of a connected peak to be compressed below their level, much like two trees resist the tendency of a hammock to sag to the ground in response to the weight on the hammock. The cutting of the webbing 51 largely eliminates this effect, thereby decreasing the capacity of the locale which includes the separated peak to resist the weight of a body.

Figure 9:
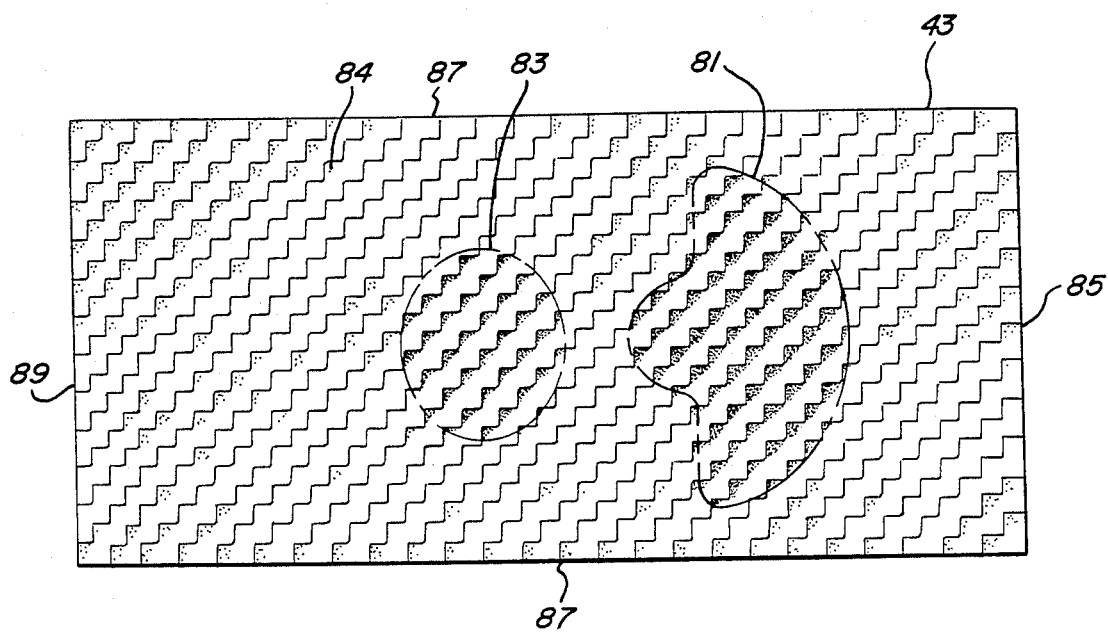
FIG. 9 is a schematic plan view illustrating the general spacing of the tail and shoulder regions of a bed pad made in accordance with the principles of the present invention.
Figure 14:
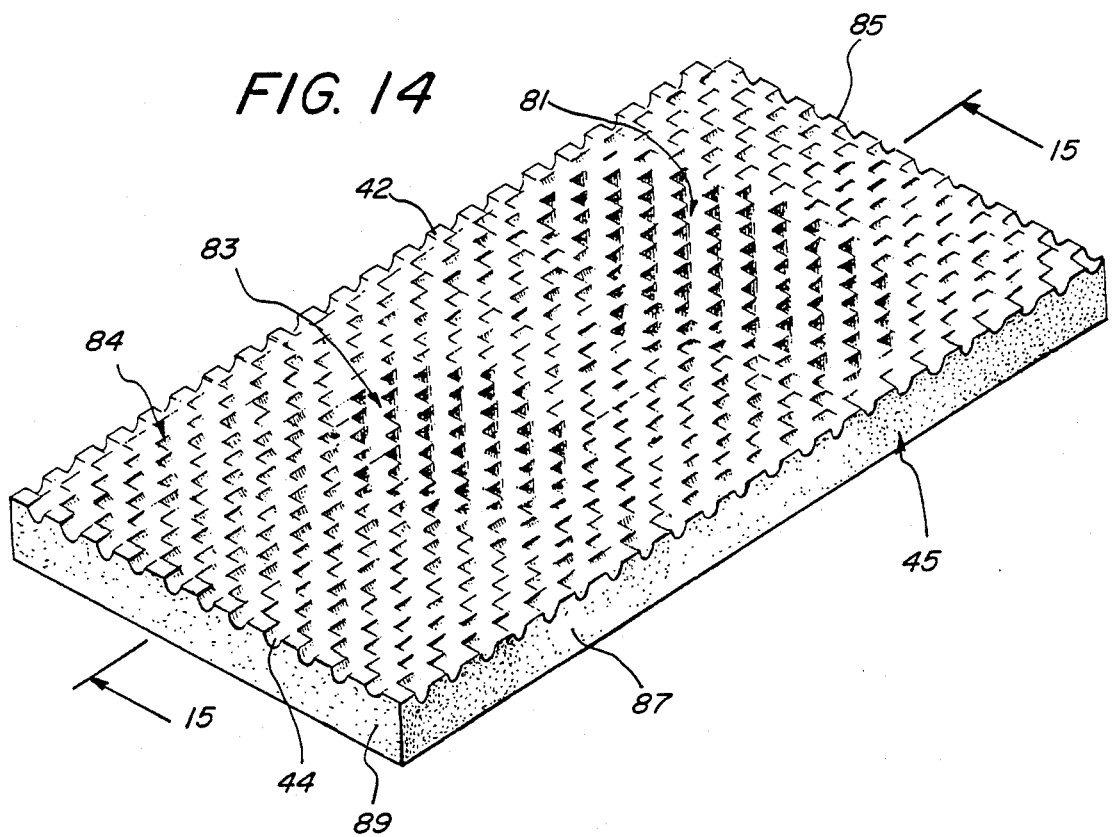
FIG. 14 is a perspective view of the bed of FIG. 9.

Referring to FIG. 9, there is shown a schematic view of a bed pad 43 manufactured in accordance with the principles of the present invention. As further shown in FIGS. 14, the bed pad 43 will generally have an overall length of between 60-90 inches and a width of between 25-40 inches, depending upon the length and width of the mattress being covered. The illustrated pad 43 has a length of approximately 72 inches and a width of approximately 35 inches. The shoulder support area 81 and tail support area 83 of the pad 43 are positioned to correspond to the normal position of the shoulder and tail portions of the body of the intended user and are surrounded by the general support area 84 of the pad 43. The shoulder support area 81 of the illustrated pad 43 is spaced twelve inches from one end 85 of the pad, is centered between the sides 87 of the pad and has a width of 28.35 inches and a length of 14.85 inches. The width and length of the shoulder support area 81, as well as its shape may vary, but preferably the width is between 25 and 33 inches, the length is between 12 and 17 inches and the shape is generally that of a mushroom. There is a gap of 6 inches between the shoulder and tail support areas of the pad 43. The tail support area 83 of the illustrated pad 43 is elliptical in shape, is centered between the sides of the pad, has a width of 17.55 inches and a length of 12.15 inches. This spaces the tail support area 27 inches from the other end 89 of the pad. As with the shoulder support area 81, the width and length of the tail support area 83, as well as its shape, may vary, but preferably, the width is between 15 and 20 inches, the length is between 10 and 17 inches, and the area is generally elliptical or circular in shape.

Figure 15:
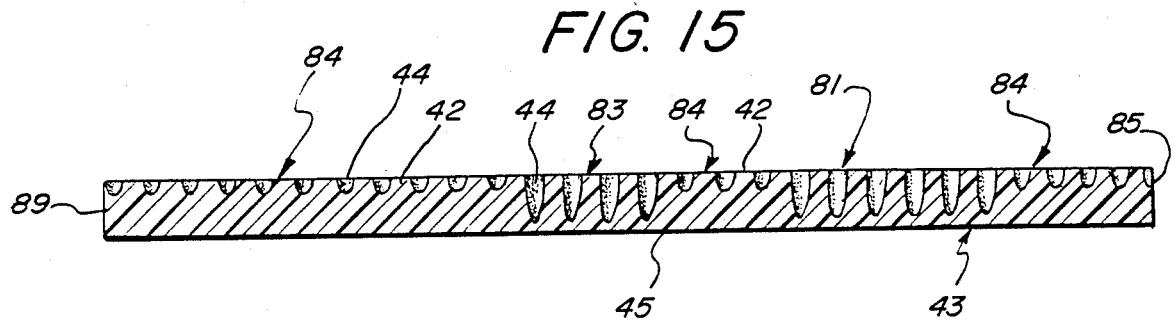
FIG. 15 is a sectional view taken along line 15-15 of FIG. 14 illustrating the varying valley thicknesses of the different areas of the bed pad.

Although the sizes of the peaks 42 and valleys 44 of the pad 43 may be varied, the illustrated pad has a uniform distribution of peaks of square cross section. The peaks 42 of the general support area, the shoulder support area 81 and the tail support area 83 all have a peak thickness of 4 inches and a square cross section with a width of 1.35 inches. As best seen in FIG. 15, to provide the desired lowered resistance and body contouring features, the valley thicknesses of the shoulder and tail support sections of the pad are less than the valley thicknesses of the general support area of the pad. Specifically, the valley thickness for both the shoulder support area 81 and the tail support area 83 is one half of one inch, while the valley thickness for the general support area is 3 inches.

Advantageously, the bed pad 43 is formed by means of inserting a block 19 of foam lengthwise through a roller having a circumference equal to the length of the bed pad 43, so that a pair of pads is formed by a single turn of the roller. Thus, the illustrated pad 43 would be formed with two rollers each having a circumference of 72 inches. The fingers 15 of each roller corresponding to the general support area of the pad 43 advantageously extend radially 2.5 inches from the cylindrical core of the roller and have a square cross section with a width of 0.9 inches. This width may vary, but is preferably between 1.25 and 2.0 inches. The space between the opposing rollers, 13 and 14, is roughly one quarter of an inch, with this distance being shortened where the rollers are provided with caps. The fingers 15 of the roller corresponding to the shoulder support area 81 and the tail support area 83 are advantageously formed by fingers 15 with an effective finger height of 2.6875 inches, resulting from the placing of caps 23 having a combined thickness of 3/16 of an inch onto the end of the fingers 15. The resulting bed pad 43 is 4 inches thick with a valley thickness of 0.5 inches which is sufficient to prevent bottoming out in most cases.

In a test comparing a bed pad, generally conforming to the specifications set forth above, with static water, static air and other convoluted foam support pads, the bed pad of the present invention not only demonstrated pressure relief capabilities, in the scapulae, sacrum and trochanter areas, superior to the other convoluted foam bed pads tested, but demonstrated pressure redistribution capabilities in these areas comparable to the static air and water support pads tested. Specifically, the pads tested are as follows:

| Designation | Manufacturer | Trademark | Model No. | Type |
|---|---|---|---|---|
| Foam #1* | Pre-Foam, Inc. | HIGHFLOAT | 5095020 | foam |
| Water | Lotus Healthcare Products | LOTUS | HM3666 | water |
| Air | Gaymar Industries, Inc. | SOF•CARE | SC-402 | air |
| Foam #2 | Bio Clinic Company | BIOGARD | 669030 | foam |
| Foam #3 | Span America Medical Systems, Inc. | GEO-MATT | 50960-581 | foam |
| Foam #4 | Pre-Foam, Inc. | PREVENT | P141 | foam |

*Foam Pad #1 is a pad made in accordance with the principles of the present invention.

A summary of the test results are set forth below in the following table:

| Pad Designation | Pressure Level | | |
|---|---|---|---|
| | Scapulae (mm Hg) | Sacrum (mm Hg) | Trochanter (mm Hg) |
| Foam #1* | 24.02 | 28.28 | 44.22 |

-continued

| Pad Designation | Pressure Level | | |
|---|---|---|---|
| | Scapulae (mm Hg) | Sacrum (mm Hg) | Trochanter (mm Hg) |
| Water | 22.44 | 25.96 | 46.74 |
| Air | 32.36 | 33.15 | 40.57 |
| Foam #2 | 29.26 | 34.40 | 47.17 |
| Foam #3 | 23.04 | 31.97 | 49.73 |
| Foam #4 | 28.04 | 36.88 | 45.97 |

Thus, there is provided a convoluted foam bed pad which is both simple and inexpensive to manufacture and which provides high pressure redistribution capabilities comparable to static air and water support pads.

The method and teachings of the present invention can be used to manufacture pads of a wide variety of shapes and sizes. Specifically, the method of the present invention can be used to manufacture pillows and wheelchair pads which conform to the shape of the body, thereby increasing the total surface area of the pad resisting the body weight of the user.

Figure 10:
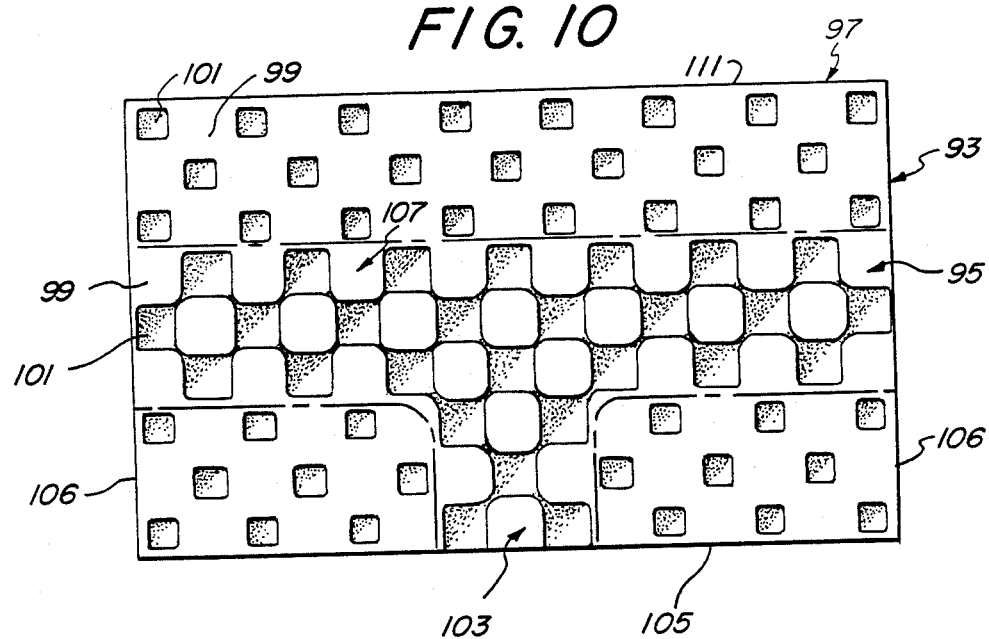
FIG. 10 is a schematic plan view of a pillow made in accordance with the principles of the present invention illustrating the shape of the head and neck support area in phantom.
Figure 12:
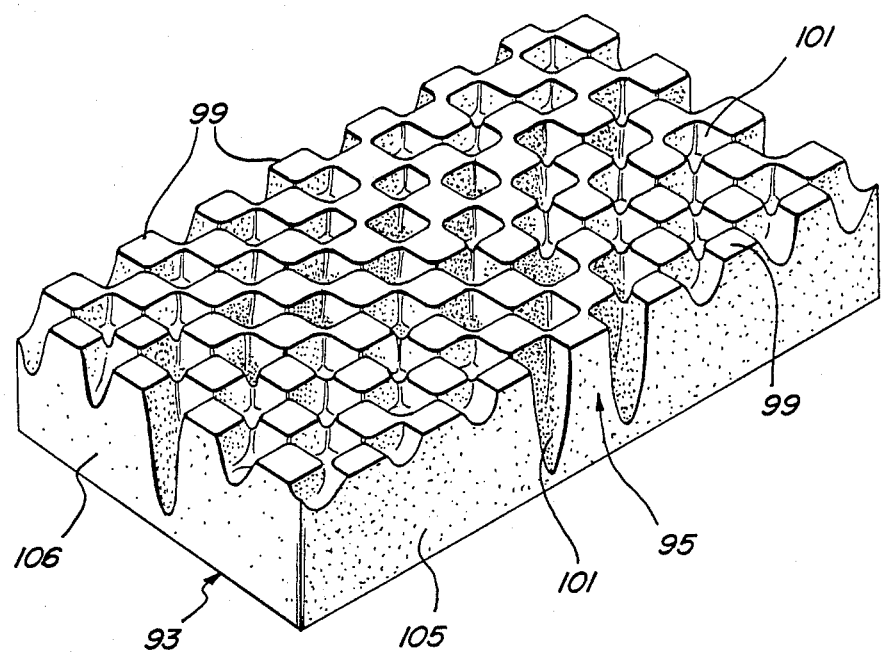
FIG. 12 is a perspective view of the pillow of FIG. 10.

FIGS. 10 and 12 show a pillow 93 having a generally T-shaped head and neck support area 95 and a general support area 97. As with the bed pad 43, the pillow 93 is formed by peaks 99 arranged in rows, wherein each peak has a flat top, is spaced from any adjacent peak in the same row by a valley 101 and has generally identical peak thicknesses. The tops of the peaks are all in substantially the same plane, thereby providing a pillow 93 of pleasing appearance which can be used with standard pillow covers. To increase the pillow's capacity to conform to the head and neck of the user, the average valley thickness of the head and neck support area 95 is less than the average valley thickness of the general support area 97. Although the dimensions of the pillow 93 can obviously be varied widely, depending upon the desired application, the illustrated pillow 93 has a width of 21 inches and a depth of 14 inches, with a uniform peak thickness of 4 inches. The truncated stem 103 of the T-shaped head and neck support area 95 extends toward the center of the pillow 93 from one end 105, is centered between the sides 106 of the pillow and has a width of 4.05 inches. The crossbar 107 of the T-shaped head and neck support area 95 extends from one side of the pillow to the other, is spaced 4.05 inches from the end of the pillow from which the stem portion extends, and has a depth of 4.05 inches. This spaces the stem portion 5.90 inches from the opposite end 111 of the pillow. The desired contouring effect may be obtained from a T-shaped head and neck support area 95 with an average valley thickness of ½ an inch and the general support area 97 with a uniform valley thickness of 3 inches.

Figure 11:
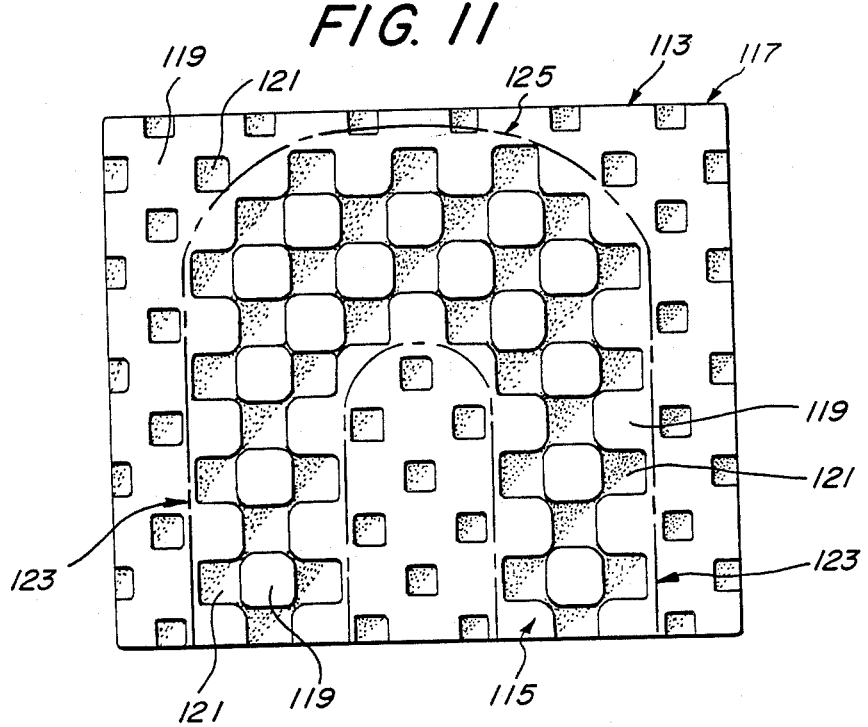
FIG. 11 is a schematic plan view of a wheelchair pad made in accordance with the principles of the present invention illustrating the shape of the buttock and thigh support area in phantom.
Figure 13:
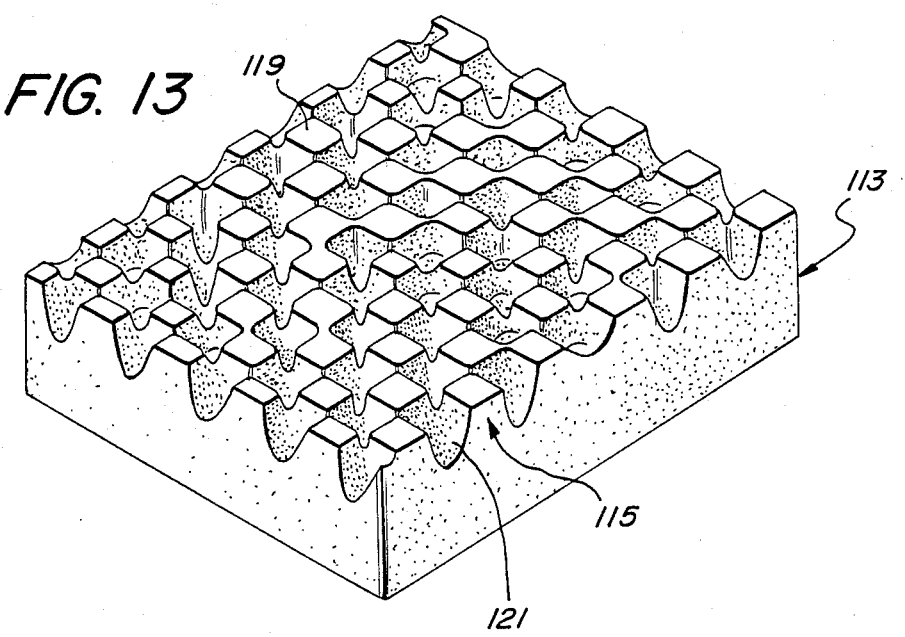
FIG. 13 is a perspective view of the wheelchair pad of FIG. 11.

FIGS. 11 and 13 show a wheelchair pad 113 having a generally U-shaped buttock and thigh support area 115 and a general support area 117. As with the pillow 93 and bed pad 43, the wheelchair pad 113 is formed by peaks 119 arranged in rows, wherein each peak has a flat top, is spaced from any adjacent peak in the same row by a valley 121 and has generally identical peak thickness. The tops of the peaks are also all in substantially the same plane, thereby providing a wheelchair pad 113 of pleasing appearance. To increase the wheelchair pad's capacity to conform to the buttocks and thighs of the user, the average valley thickness of the buttock and thigh support area 115 is less than the average valley thickness of the general support area 117. Although the dimensions of the wheelchair pad 113 can obviously be varied, depending upon the size of the chair and the user, the illustrated wheelchair pad 113 has a width of 18 inches and a depth of 16 inches, with a uniform peak thickness of 4½ inches. The legs 123 of the T-shaped buttock and thigh support area 115 extend toward the opposite end of the wheelchair pad from one end, are spaced 2.295 inches from the sides of the wheelchair pad and have a width of 4.05 inches. An arcuate connecting portion 125 connects the two legs of the U-shaped buttock and thigh support area 115, is spaced 1¼ inches from the opposite end of the wheelchair pad, and has a width of 4.05 inches. The desired contouring effect may be obtained from a U-shaped buttock and thigh support area 115 with an average valley thickness of ¾ inches and the general support area 117 with a uniform valley thickness of 3½ inches.

What is claimed is:

1. An elongate convoluted foam pad for supporting a reclining human body on a bed, comprising:
    a bottom;
    a shoulder support area for supporting the shoulder portion of a body formed by peaks arranged in rows, wherein each peak has a substantially flat top and is spaced from any adjacent peak in the same row by a valley;
    a tail support area for supporting the tail portion of said body formed by peaks arranged in rows, wherein each peak has a substantially flat top and is spaced from any adjacent peak in the same row by a valley; and
    a general support area surrounding said shoulder support area and said tail support area formed by peaks arranged in rows, wherein each peak has a substantially flat top and is spaced from any adjacent peak in the same row by a valley, said valleys of said shoulder support area, said valleys of said tail support area and said valleys of said general support area each having an average valley thickness, wherein each of said peaks has a substantially uniform peak thickness and wherein said average valley thickness of said valleys in said shoulder support area and said average valley thickness of said valleys in said tail support area are less than said average valley thickness of said valleys in said general support area.

2. The pad of claim 1, wherein all of said substantially flat tops are included in a single plane.

3. The pad of claim 2, wherein said pad is formed from a polyurethane foam having a density of between one and three pounds per cubic foot.

4. The pad of claim 3, wherein said peaks have a peak thickness between one and five inches.

5. The pad of claim 4, wherein some of said peaks have corners and some of said corners are connected to other of said corners of other peaks by webbing.

6. The pad of claim 5, wherein at least some of said corners are not connected by webbing, thereby providing a locale of decreased resistance to pressure.

7. A convoluted foam pad for supporting a human body on a bed, comprising:
    a bottom;
    a general support area;
    a shoulder support area; and
    a tail support area, each of said areas comprising adjacent rows of peaks having substantially flat tops and generally rectangular cross sections which form corners, said peaks in each row being separated by valleys and said peaks in adjacent rows being staggered, said valleys of said shoulder support area, said valleys of said tail support area and said valleys of said general support area each having an average valley thickness, said average valley thickness of said valleys in said general support area being greater than said average valley thickness of said valleys in said shoulder support area and greater than said average valley thickness of said valleys in said tail support area, said peaks and said valleys forming a checkerboard pattern wherein at least some of said corners of said peaks in adjacent rows are connected by webbing.

8. The pad of claim 7, wherein at least some of said corners of said peaks in adjacent rows are not connected by webbing, thereby decreasing the resistance of the locale including the nonconnected corners to pressure.

9. A convoluted foam pillow for supporting the head and neck of a body, comprising:
 a bottom;
 a general support area formed by peaks arranged in rows, wherein each peak has a substantially flat top and is spaced from any adjacent peak in the same row by a valley; and
 a generally T-shaped head and neck support area formed by peaks arranged in rows, wherein each peak has a substantially flat top and is spaced from any adjacent peak in the same row by a valley, wherein each of said peaks has a substantially uniform peak thickness said valleys of said general support area and said valleys of said head and neck support area each having an average valley thickness, wherein said average valley thickness of said valleys in said head and neck support area is less than said average valley thickness of said valleys in said general support area, thereby forming an area of greater capacity to conform to the shape of said head and said neck of said body.

10. The pillow of claim 9, wherein all of said substantially flat tops are included in a single plane.

11. The pillow of claim 10, wherein said pillow is formed from a polyurethane foam having a density of between one and three pounds per cubic foot.

12. The pillow of claim 11, wherein said peaks have a peak thickness between one and five inches.

13. The pad of claim 12, wherein said peaks form corners and some of said corners of said peaks are connected to said corners of other of said peaks by webbing.

14. The pad of claim 13, wherein at least some of the corners of said peaks are not connected by webbing, thereby providing a locale of decreased resistance to pressure.

15. A convoluted foam wheelchair pad for supporting the thigh and buttocks of a body on a wheelchair, comprising:
 a bottom;
 a general support area formed by peaks arranged in rows, wherein each peak has a substantially flat top and is spaced from any adjacent peak in the same row by a valley; and
 a generally U-shaped thigh and buttock support area formed by peaks arranged in rows, wherein each peak has a substantially flat top and is spaced from any adjacent peak in the same row by a valley, wherein each of said peaks has a substantially uniform peak thickness, said valleys of said general support area and said valleys of said thigh and buttock support area each having an average valley thickness, wherein said average valley thickness of said valleys in said thigh and buttock support area is less than said average valley thickness of said valleys in said general support area, thereby forming an area of greater capacity to conform to the shape of said thighs and buttocks of said body.

16. The pad of claim 15, wherein all of said substantially flat tops are included in a single plane.

17. The pad of claim 16, wherein said pad is formed from a polyurethane foam having a density of between one and three pounds per cubic foot.

18. The pad of claim 17, wherein said peaks have a peak thickness between one and five inches.

19. The pad of claim 18, wherein said peaks form corners and some of said corners of said peaks are connected to the corners of other peaks by webbing.

20. The pad of claim 19, wherein at least some of said corners are not connected by webbing to other of said peaks, thereby providing a locale of decreased resistance to pressure.

* * * * *